United States Patent [19]
Manning

[11] Patent Number: 6,085,122
[45] Date of Patent: Jul. 4, 2000

[54] END-OF-VECTOR LASER POWER CONTROL IN A SELECTIVE LASER SINTERING SYSTEM

[75] Inventor: Gerald L. Manning, Austin, Tex.

[73] Assignee: DTM Corporation, Austin, Tex.

[21] Appl. No.: 08/866,600

[22] Filed: May 30, 1997

[51] Int. Cl.$^7$ ..................................................... G06F 19/00
[52] U.S. Cl. ........................................... 700/212; 700/166
[58] Field of Search .................................... 264/497, 413; 419/45; 700/166, 212, 119, 182

[56] References Cited

U.S. PATENT DOCUMENTS

| | | | |
|---|---|---|---|
| 4,247,508 | 1/1981 | Housholder | 264/219 |
| 4,540,867 | 9/1985 | Ackerman | 219/121.8 |
| 4,863,538 | 9/1989 | Deckard | 264/497 |
| 4,944,817 | 7/1990 | Bourell et al. | 264/497 |
| 5,014,207 | 5/1991 | Lawton | 364/468.27 |
| 5,017,753 | 5/1991 | Deckard | 264/497 |
| 5,076,869 | 12/1991 | Bourell et al. | 264/497 |
| 5,132,143 | 7/1992 | Deckard | 264/497 |
| 5,155,324 | 10/1992 | Deckard et al. | 264/497 |
| 5,182,170 | 1/1993 | Marcus et al. | 264/497 |
| 5,352,405 | 10/1994 | Beaman et al. | 419/45 |
| 5,616,294 | 4/1997 | Deckard | 264/413 |

*Primary Examiner*—Paul P. Gordon
*Attorney, Agent, or Firm*—Anderson, Levine & Lintel

[57] ABSTRACT

A selective laser sintering apparatus and method is disclosed, in which the laser power is controlled according to the scan velocity. The scanning system, which includes a pair of galvanometer-controlled mirrors for directing the aim of the laser beam, generates signals indicative of either the position or scan velocity of the aim of the beam, in either one or two directions. The signals are gated in the laser power control system so as to pass the signals only during those times at which the laser is to be turned on. A laser power control system receives the signals and, in the case of position signals, differentiates the signals to generate velocity signals. The velocity signals are used to derive a scan velocity, and the scan velocity is multiplied by the desired laser power at full scan velocity to produce a laser power control signal. By making the laser power dependent upon the scan velocity, a constant laser energy flux density is applied to powder at the target surface, even during acceleration and deceleration intervals at the beginning and end of a scan, respectively.

17 Claims, 5 Drawing Sheets

END-OF-VECTOR LASER POWER CONTROL IN A SELECTIVE LASER SINTERING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of laser control, and is more specifically directed to the control of laser power in a selective laser sintering system.

The field of rapid prototyping of parts has, in recent years, made significant improvements in providing high strength, high density, parts for use in the design and pilot production of many useful articles. "Rapid prototyping" generally refers to the manufacture of articles directly from computer-aided-design (CAD) data bases in an automated fashion, rather than by conventional machining of prototype articles according to engineering drawings. As a result, the time required to produce prototype parts from engineering designs has reduced from several weeks to a matter of a few hours.

One example of a rapid prototyping technology is the selective laser sintering process practiced by systems available from DTM Corporation of Austin, Tex. According to this technology, articles are produced from a laser-fusible powder in layerwise fashion. According to this process, a thin layer of powder is dispensed and then fused, or sintered, by laser energy that is directed to those portions of the powder corresponding to a cross-section of the article. After the selective fusing of powder in a layer, an additional layer of powder is then dispensed, and the process repeated, with fused portions of later layers fusing to fused portions of previous layers (as appropriate for the article), until the article is complete. Detailed description of the selective laser sintering technology may be found in U.S. Pat. No. 4,863,538, U.S. Pat. No. 5,017,753, U.S. Pat. No. 5,076,869, and U.S. Pat. No. 4,944,817, all assigned to Board of Regents, The University of Texas System, and in U.S. Pat. No. 4,247,508 assigned to DTM Corporation, all incorporated herein by this reference. The selective laser sintering technology has enabled the direct manufacture of three-dimensional articles of high resolution and dimensional accuracy from a variety of materials including wax, polycarbonate, nylon, other plastics, and composite materials such as polymer coated metals and ceramics. Wax parts may be used in the generation of tooling by way of the well-known "lost wax" process.

Conventional selective laser sintering systems, such as the SINTERSTATION 2000 system available from DTM Corporation, position the laser beam by way of galvanometer-driven mirrors that deflect the laser beam. The deflection of the laser beam is controlled in combination with modulation of the laser itself, to direct laser energy to those locations of the fusible powder layer corresponding to the cross-section of the article to be formed in that layer. The laser may be scanned across the powder in raster fashion, with modulation of the laser effected in combination therewith, or the laser may be directed in vector fashion. In some applications, cross-sections of articles are formed in a powder layer by fusing powder along the outline of the cross-section in vector fashion either before or after a raster scan that "fills" the area within the vector-drawn outline.

The thermal fusing mechanism in the selective laser sintering process depends upon the laser energy flux density, which is the thermal energy received to each location of powder per unit time. The laser flux density depends upon the laser energy, the laser spot size, and the temporal duration of the exposure of the powder to the laser energy. For most materials, the shape and density of the article being formed is sensitive to the laser energy flux density, such that even slight deviations in the laser energy flux density result in less than ideal article attributes. For example, if the laser energy flux density is too low, the article will be mechanically weak; conversely, excessive laser energy flux density can result in poor fidelity of the article dimensions relative to the CAD representation, overheating of the powder, or even burning of the powder.

The effects of geometry-dependent non-uniformity of laser energy flux density have been observed in articles fabricated by selective laser sintering, especially in the sensitive materials noted above. Typically, these effects are evident at the terminal ends of raster or vector scans. For example, conventional selective laser sintering systems simply apply a constant power level to the laser, gating the laser on and off to selectively fuse the powder. While the laser responds quite rapidly to this gating action, the galvanometers that direct the aim of the laser beam do not instantaneously accelerate and decelerate. Accordingly, using constant laser output power, the laser energy flux density received by the powder during acceleration and deceleration of the galvanometers, typically at the beginning and end of each scan, is greater than that applied to the powder once the galvanometers have reached their full scan speed. The effect of this increased laser energy is referred to in the art as "end-of-vector blooming", as the higher laser energy flux density due to increased dwell time at the ends of scan vectors will typically cause the fusing of the powder to spread, or "bloom", laterally outside of the desired scan path. This blooming is evident in the finished article as poor cosmetic appearance and, if excessive, as dimensional inaccuracy.

A known approach to eliminate end-of-vector blooming inserts programmable timing delays between the initiation of a scan and the gating on of the laser, to allow the galvanometers to at least partially accelerate prior to the application of laser power; at the end of a scan, laser power can be gated off prior to decelerating the galvanometers. However, particularly at the beginning of the scan, improper selection of the delay can be quite difficult, especially considering that the optimal delay time to avoid dimensional error can only be selected for one set of conditions (i.e., laser power and scan speed). Furthermore, a tradeoff also exists between avoidance of end-of-vector blooming and feature resolution, considering that long delays between initiation of a scan and gating of the laser reduces the resolution with which fine features in the article can be fabricated, as is especially evident in thin walled articles. In addition, the optimum delay time can dynamically vary within the build of a single article, as delay time optimization depends upon scan vector lengths, and also upon the distances between scanned vectors (i.e., the lengths of "jumps"). Besides being time-consuming and difficult, the proper choice of delay time is also often dependent upon the dynamic behavior of individual galvanometers, and thus may vary from system to system.

By way of further background, U.S. Pat. No. 5,352,405, issued Oct. 4, 1994 assigned to DTM Corporation, and incorporated herein by this reference, describes a method of scanning the laser across the powder in a selective laser sintering apparatus to provide a uniform time-to-return of the laser for adjacent scans of the same region of powder, thus providing uniform thermal conditions over the cross-section of the article. As described therein, this method scans from only slightly outside of the cross-section of the article to be formed, so that the delay between the start and stop positions of the scan and the times at which the laser is on are relatively small. Time-to-return of the laser from scan-to-scan is made more uniform, and the overall scan time for the build cycle is reduced. However, the close relationship between the scan limits and the times at which the laser is on cause the laser to be turned on during acceleration and deceleration intervals at the ends of the scans, during which more energy is delivered to the powder per unit time than when the scan is at full speed. Distortion of the article being formed can thus result.

By way of further background, U.S. Pat. No. 5,014,207, issued May 7, 1991, describes a technique for modulating the laser power in accordance with sweep speed in a stereolithography system. As is well-known in the art, stereolithography refers to a technology by way of which three-dimensional articles are formed by the selective application of laser energy to successive layers of a photopolymerizable liquid. As is described in detail in U.S. Pat. No. 5,014,207, the formation of articles by stereolithography had previously been vulnerable to variations in the depth of hardening of the photopolymerizable liquid. Specifically, this reference discloses that the cross-section of solidification of a scan of the photopolymerizable liquid is nonGaussian. Because of this effect, undesirable ripple would be present in the lower surface of the article being formed, unless the non-Gaussian profile is taken into account by closely spacing adjacent scan lines; this close spacing requires increased scan velocities in order to maintain reasonable build times. The reference further discloses that the use of high scan velocities in turn resulted in longer acceleration times, which caused non-uniform depth of solidification along scan lines due to non-uniformities in scan velocity during the acceleration times. The reference discloses a technique of controlling laser power (i.e., duty cycle) in accordance with scan velocity, so that the laser beam is turned on for a set period of time per unit distance over the full scan.

It has been observed, however, in connection with the present invention, that the depth of hardening of powder by selective laser sintering does not substantially depend upon the laser power density applied to the powder. This insensitivity of depth of hardening is due to the thermal nature of the selective laser sintering mechanism, which in fact generally follows a Gaussian profile. Accordingly, variations in dwell time of a constant power laser beam over powder, such as during acceleration portions of a scan, does not result in variations of the depth of hardening, but instead is manifest in lateral blooming of the hardened structure outside of the laser scan line because of conduction of the thermal energy in the powder away from the scanned locations. In contrast, no lateral blooming is evidenced in stereolithography, as photopolymerization occurs only at locations at which photons impinge upon the liquid, with no conduction occurring outside of the scan lines.

BRIEF SUMMARY OF THE INVENTION

It is therefore an object of the present invention to provide a selective laser system which delivers more uniform laser energy flux density to the powder being fused, over the full length of each scan.

It is a further object of the present invention to provide such a system in which the improved uniformity may be assured over a wide range of operating conditions.

It is a further object of the present invention to provide such a system which automatically adjusts the laser power so as to deliver uniform laser energy flux density.

It is a further object of the present invention to provide such a system in which the laser energy flux density is uniform independently of the direction of the scan.

Other objects and advantages of the present invention will be apparent to those of ordinary skill in the art having reference to the following specification together with its drawings.

The present invention may be implemented into a selective laser system in which the laser power is slaved to the instantaneous velocity of the galvanometers that direct the laser beam, so that the product of the laser power and galvanometer velocity is substantially constant, regardless of the instantaneous velocity of the galvanometer.

DETAILED DESCRIPTION OF THE INVENTION

Figure 1:
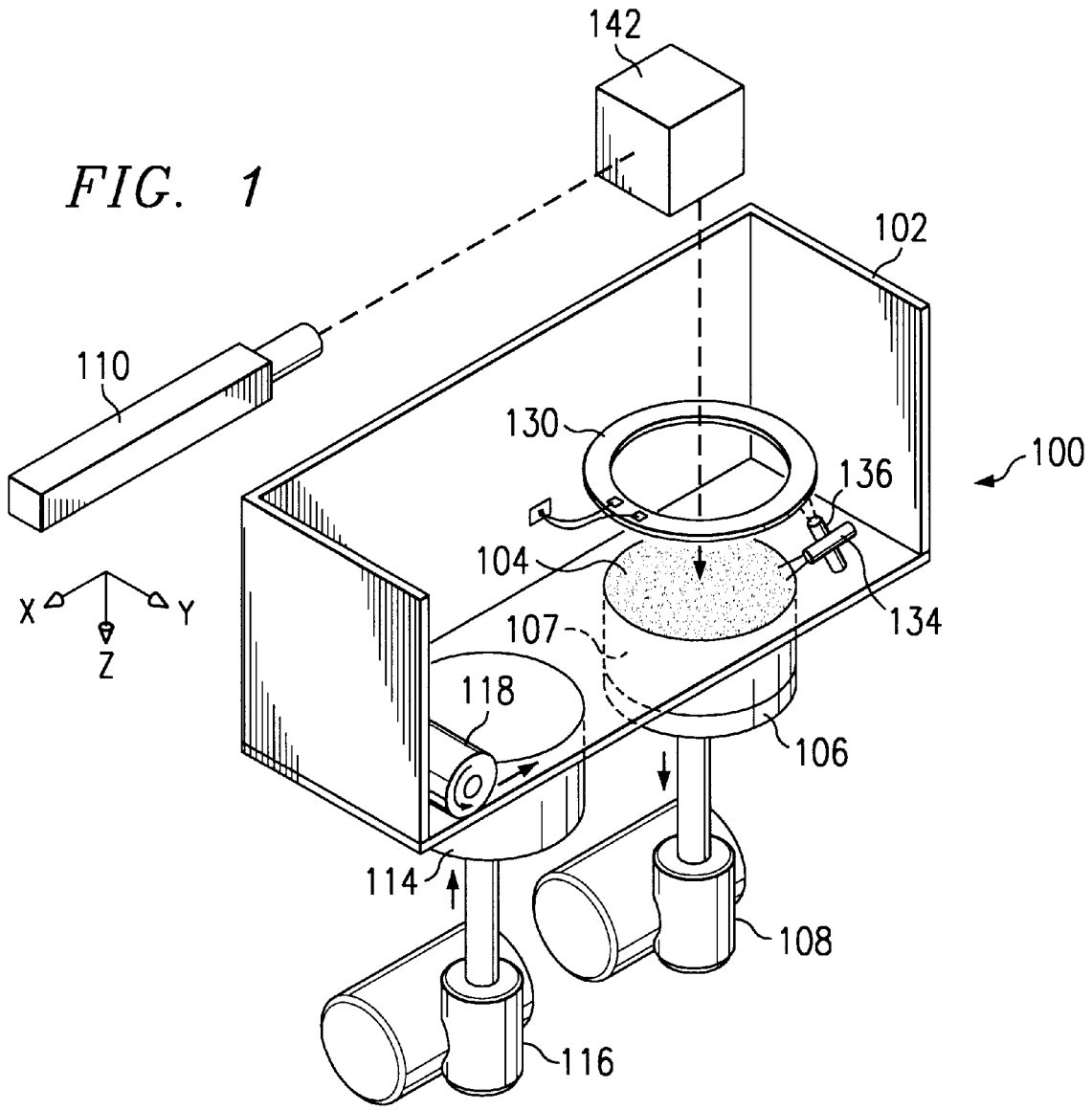
FIG. 1 is a perspective cutaway and schematic view of a selective laser sintering system according to the preferred embodiment of the invention.

Referring first to FIG. 1, the construction and operation of selective laser sintering system 100 will be described, for purposes of explanation of the preferred embodiments of the present invention. As shown in FIG. 1, selective laser sintering system 100 includes a chamber 102 (the front doors and top of chamber 102 not shown in FIG. 1, for purposes of clarity). Chamber 102 maintains the appropriate temperature and atmospheric composition (typically an inert atmosphere such as nitrogen) for fabrication of the article therein.

The powder delivery system in system 100 includes feed piston 114, controlled by motor 116 to move upwardly and lift a volume of powder into chamber 102; part piston 106, controlled by motor 108, moves downwardly below the floor of chamber 102 by a small amount, for example 5 mils, to define the thickness of each layer of powder to be processed. Roller 118 is a counter-rotating roller that translates powder from feed piston 114 to target surface 104. Target surface 104, for purposes of the description herein, refers to the top surface of heat-fusible powder (including portions previously sintered, if present) disposed above part piston 106;

the sintered and unsintered powder disposed on part piston 106 will be referred to herein as part bed 107.

As described in the above-referenced U.S. Pat. No. 5,017, 753, roller 118 (preferably provided with a scraper to prevent buildup, such scraper not shown in FIG. 1 for clarity) spreads the powder within chamber 102 and over target surface 104 by its translation from feed piston 114 toward and across target surface 104 at the surface of part bed 107 above part piston 106. It is preferable, for smooth and thorough distribution of the powder, that the amount of powder provided by feed piston 114 be greater than that which can be accepted at the surface of part bed 107, so that some excess powder will result from the motion of roller 118 across target surface 104; this may be accomplished by the raising of feed piston 114 above the floor of chamber 102 by a greater distance that the distance below the floor of chamber 102 that part piston 106 is lowered (e.g., 10 mils versus 5 mils). It is also preferable to slave the counter-rotation of roller 118 to the translation of roller 118 within chamber 102, so that the ratio of rotational speed to translation speed is constant. It may be preferred to provide two powder pistons 114 on either side of part piston 106, for purposes of efficient and flexible powder deliver, as used in the SINTERSTATION 2000 system available from DTM Corporation.

Fabrication of a cross-section of the desired article or articles is effected by laser 110, which provides a beam which is directed by scanning system 142 in the manner described in the U.S. Patents referred to hereinabove and as will now be described relative to FIG. 2. Laser 110 includes, in addition to a laser itself, such conventional control elements as described in the above-referenced U.S. Pat. No. 4,863,538, including for example a front mirror assembly, and focusing elements such as diverging and converging lenses. The type of laser 110 used depends upon many factors and in particular upon the type of powder that is to be sintered. For many types of conventional powders, a preferred laser is a 50 watt $CO_2$ type laser with controllable power output. Laser 110, when on, emits laser beam 105 that travels generally along the path shown by the arrows in FIG. 2.

Computer 140 and scanning system 142 are included for controlling the direction of the laser beam 105 as it impinges target surface 104. In this preferred embodiment of the invention, computer 140 includes a controlling microprocessor for scanning system 142 and further includes a system for storing the CAD/CAM data base, in slice-by-slice form, to defines the dimensions of the article or articles being produced. A conventional personal computer workstation, such as a personal computer based on a Pentium-class microprocessor and including floating point capabilities, is suitable for use as computer 140 in the preferred embodiment of the invention. Computer 140 generates signals on lines AIM to scanner processor 103, in scanning system 142, to direct laser beam 105 across target surface 104 according to the cross-section of the article to be produced in the current layer of powder.

Scanning system 142 includes prism 144 for redirecting the path of travel of laser beam 105; the number of prisms 144 necessary for directing laser beam 105 to the proper location is based on the physical layout of the apparatus. Alternatively, as is well known in the art, one or more fixed mirrors can be used in place of prism 144 for directing laser beam 105, depending upon the particular layout of system 100. Scanning system 142 further includes a pair of mirrors 146, 147 which are driven by respective galvanometers 148, 149. Galvanometers 148, 149 are coupled to their respective mirrors 146, 147 to selectively orient the mirrors 146, 147 and control the aim of laser beam 105. Galvanometers 148, 149 are mounted perpendicularly to one another so that mirrors 146, 147 are mounted nominally at a right angle relative to one another. Scanner processor 103 in scanning system 142 controls the movement of galvanometers 148, 149 to control the aim of laser beam 105 within target surface 104, in response to the signals on lines AIM from computer 140 that are generated according to the CAD/CAM data base stored therein that defines the cross-section of the article to be formed in the layer of powder at target surface 104.

In addition, computer 140 generates signals to laser power control system 150 on line DLP to indicate the desired level of power to be delivered by laser 110 when on. Scanner processor 103 generates signals on line LON/LOFF_ indicating the times at which laser 110 is to be turned on or off according to the CAD/CAM data base representation of the slice of the article for the current layer of powder. According to the preferred embodiments of the invention, the combination of the signals on line LON/LOFF_with signals on one or more lines FB indicating the position or velocity of galvanometers 148, 149 (and thus mirrors 146, 147), which are also generated by scanner processor 103, controls laser power control system 150 to produce a time-varying signal to laser 110 on line LP corresponding to the instantaneous power to be delivered. As will become apparent from the following description, laser power control system 150 according to the preferred embodiments of the present invention controls laser 110 to deliver a constant laser energy flux density to the powder. While laser power control system 150 is illustrated as a separate component in FIG. 2, laser power control system 150 may of course be implemented within computer 140 or scanner processor 103, if desired.

It has been discovered, in connection with the present invention, that a laser power level that is directly proportional to the scan velocity will result in delivery of substantially a constant laser energy flux density to the powder. The laser energy flux density refers to the energy per unit time and per unit area that is delivered to the powder. Assuming a constant laser spot size, as is the case in modern selective laser sintering systems, it becomes readily apparent that the laser energy flux density is directly proportional to both the laser power and the time duration that the laser beam impinges the powder, and is thus inversely proportional to the scan velocity, as follows:

$$\Phi \propto \frac{P}{V}$$

where $\Phi$ is the laser flux density, P is the laser power, and V is the scan velocity. As noted above, the scan velocity V may vary at the beginning and end of vector scans, as the galvanometers 148, 149 and associated mirrors 146, 147 accelerate and decelerate. Accordingly, it has been discovered in connection with the present invention that if the laser power P is controlled to be directly proportional to the time-varying scan velocity V, the laser flux density $\Phi$ delivered to the powder will be constant, independent of the instantaneous scan velocity.

Figure 2:
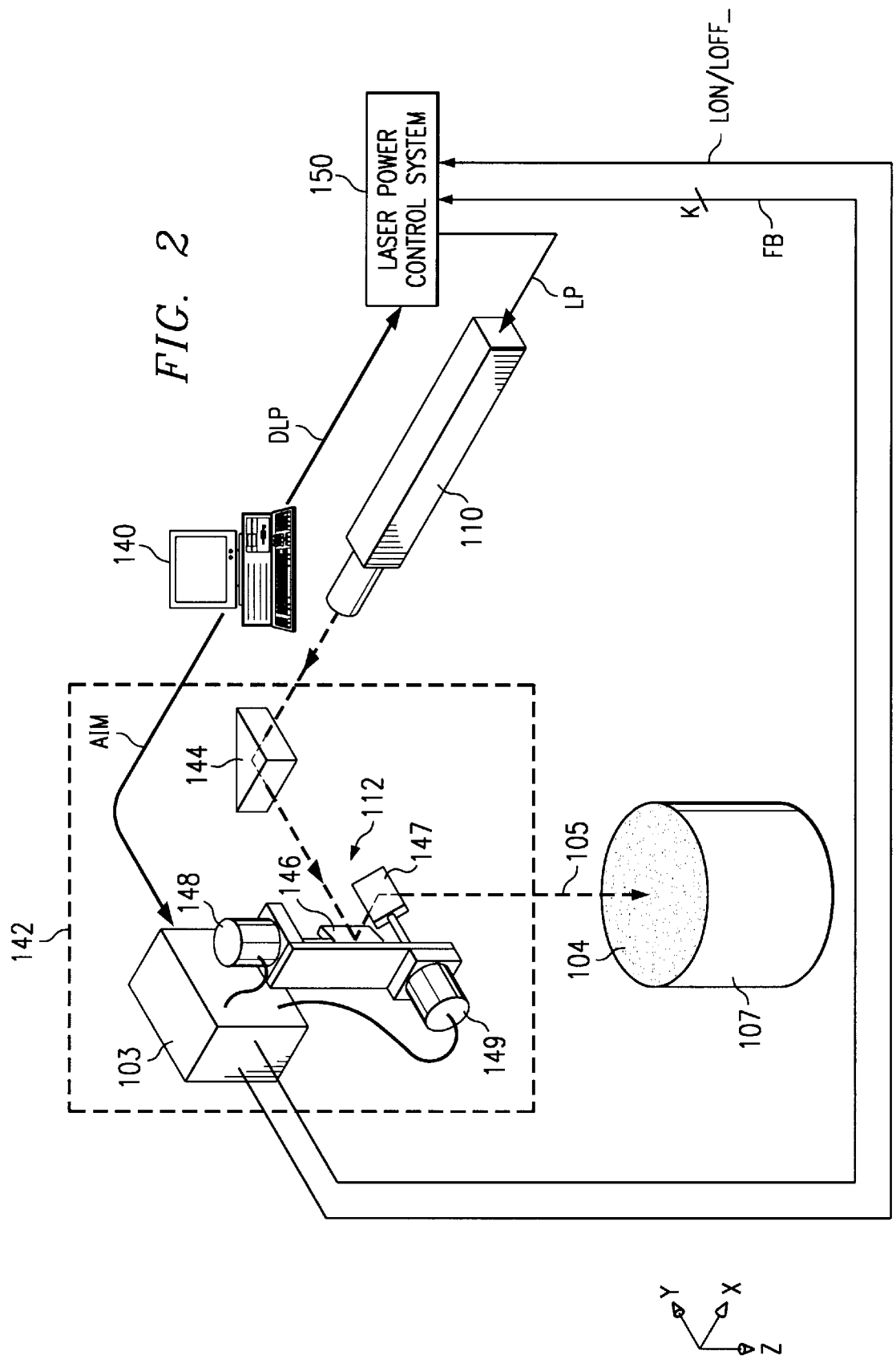
FIG. 2 is a perspective cutaway and schematic view of the laser control system according to the preferred embodiment of the invention.
Figure 3:
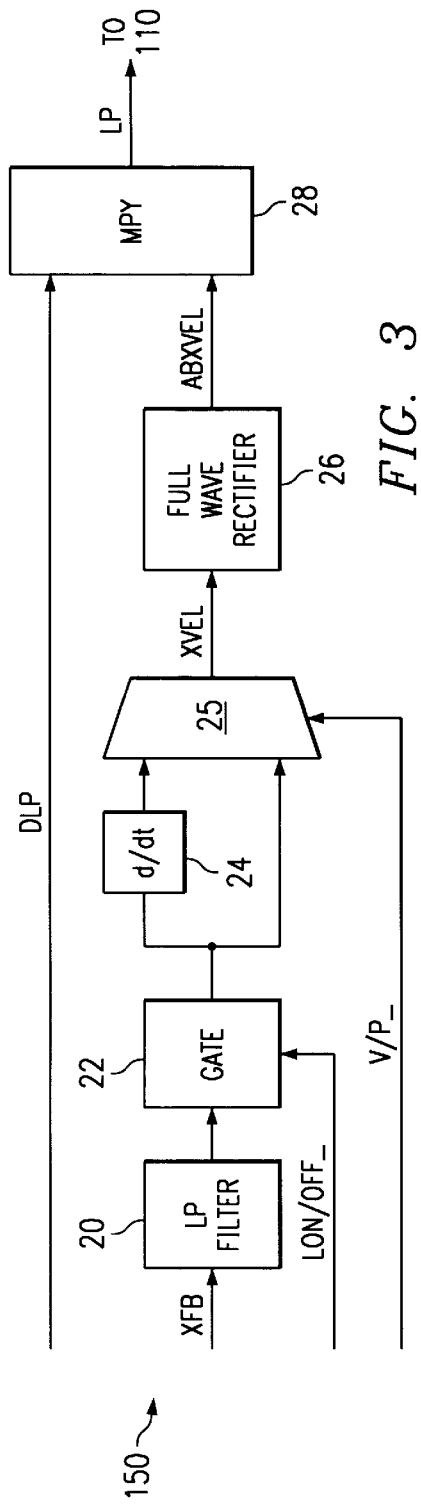
FIG. 3 is a functional block diagram of a laser power control system according to a first embodiment of the invention.

Referring now to FIG. 3, the functional arrangement of laser power control system 150 according to a first embodiment of the present invention will now be described in detail. According to this first embodiment of the present invention, laser power control system 150 controls the laser power as a function of the scan velocity along a single axis, such as in the case of a raster scan of laser beam 105 across target surface 104 in the example of FIG. 2. As illustrated in FIG. 2, a raster scan of laser beam 105 scans along parallel lines in the x-direction, incrementing from scan to scan in the y-direction (i.e., the x-axis is the "fast" axis in the raster scan). In this example, galvanometer 149 and mirror 147 control the scan of lines in the x-direction, while galvanometer 148 and mirror 146 controls the position along the y-direction of the x-direction scans performed by galvanometer 149 and mirror 147.

As shown in FIG. 3, laser power control system 150 receives an x-direction control signal on line XFB from galvanometer 149 via scanner processor 103. In this embodiment of the invention, the signal on line XFB is a feedback control signal that can indicate either the instantaneous scan velocity or the instantaneous position of galvanometer 149 and mirror 147 in setting the aim of laser beam 105. While feedback control signals are utilized to communicate scan velocity or scan position according to the preferred embodiments of the invention described herein, it is of course to be understood that control signals of other types, such as those directing the scanning to be carried out by scanner processor 103 via galvanometers 148, 149 may alternatively be used.

In this embodiment of the invention, laser power control system 150 also receives line V/P_that indicates whether the feedback control signal XFB is a velocity signal or a position signal. Line XFB is included within lines FB communicated to laser power control system 150 as shown in FIG. 2, while line V/P_is preferably implemented as a jumper that is hardwired to either a high or low voltage corresponding to the type of signal communicated on line XFB. As noted in FIG. 2, laser power control system 150 also receives a signal from scanner processor 103 on line LON/LOFF_that indicates whether the laser is to be on or off at any given position in the scan, according to the locations of the cross-section of the article to be formed in the current layer of powder, as indicated by the CAD/CAM data base. Computer 140 generates a signal on line DLP that indicates the desired full power level to which laser 110 is to be energized when at full scan speed. This full power level will depend upon the characteristics of the powder material at target surface 104, and as such is typically a parameter that is selected by the user in setting up a build cycle.

Laser power control system 150 according to this first embodiment of the invention may be implemented as either an analog or a digital system, depending upon the particular implementation desired, and also according to the nature of the feedback control signals generated by scanner processor 103 and the control signals required by laser 110. It is contemplated that those of ordinary skill in the art having reference to this specification will be able to readily implement laser power control system 150 according to the particular technology appropriate to the implementation.

As shown in FIG. 3, laser power control system 150 includes low-pass filter 20, which receives the feedback control signal on line XFB from scanner processor 103; as noted above, this feedback control signal may be representative of either the scan velocity or the beam position in the x-direction, and in either case is a time-varying signal. Filter 20 eliminates high frequency noise from the feedback control signal on line XFB, and applies the filtered signal to gate 22. Gate 22 is controlled by the signal on line LON/LOFF_to selectively pass the filtered feedback control signal during such time as laser 110 is to be on, and to block the filtered feedback control signal during such time as laser 110 is to be off.

The output of gate 22 is applied to one input of selector 25, and also to the input of differentiator 24 which generates a time-varying signal representative of the time-derivative of the signal at the output of gate 22. Selector 25 is controlled by the state of line V/P_to select either the output of gate 22 or the output of differentiator 24 to forward to its output on line XVEL. According to this embodiment of the invention, if line V/P_indicates (with a low logic level) that the signal on line XFB is a position signal, selector 25 will forward the output of differentiator 24 to line XVEL, which corresponds to the scan velocity. If the signal on line XFB is already a velocity signal, as indicated on line V/P_(with a high logic level), selector 25 will apply the output of gate 22 to line XVEL. In either case, the time-varying signal on line XVEL corresponds to the x-direction scan velocity of the laser beam 105 across target surface 104 during such time as laser 110 is to be turned on.

The x-direction velocity signal on line XVEL is applied to full wave rectifier 26, which generates a rectified signal at its output on line ABXVEL to communicate the absolute value of the x-direction scan velocity. This signal is applied to one input of multiplier 28, which receives the full laser power signal on line DLP at another input. Multiplier 28 presents a signal on line LP that corresponds to the product of the full laser power level, as communicated on line DLP with the absolute value of the x-direction scan velocity, as communicated on line ABXVEL. The signal on line LP, according to this embodiment of the invention, is applied to laser 110 as the desired laser power at which laser 110 forms laser beam 105. As apparent from the foregoing description, the laser power signal on line LP is based not only upon the full laser power level on line DLP, but also upon the instantaneous velocity of the beam in the scan direction. Of course, various scaling factors may be included in this multiplication for purposes of calibration of the signal on line LP with laser 110, and for normalization of the product so that the full scan speed velocity will correspond to the full desired laser power level.

Figure 4:
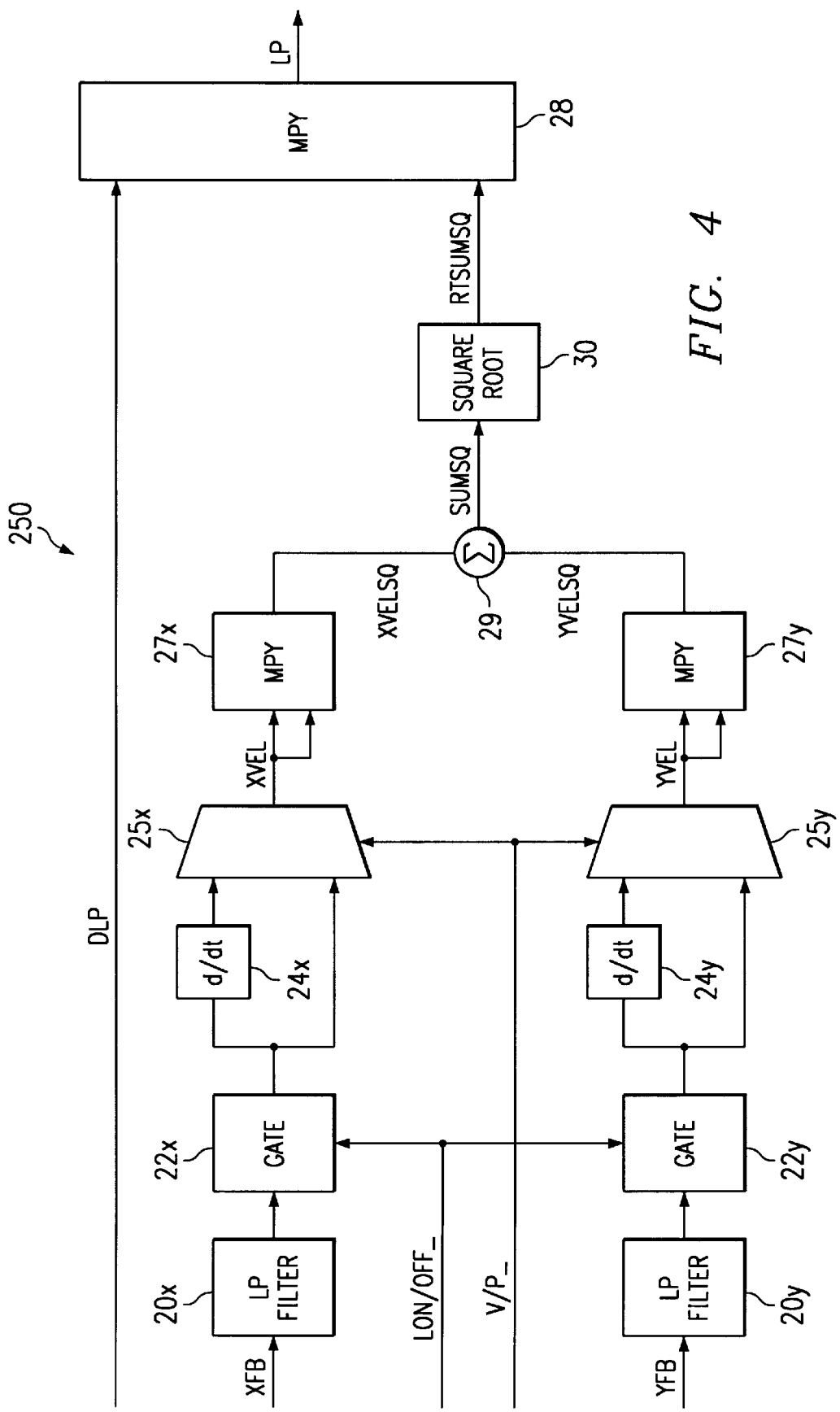
FIG. 4 is a functional block diagram of a laser power control system according to a second embodiment of the invention.

Referring now to FIG. 4, the functional arrangement of laser power control system 250 according to a second embodiment of the present invention will now be described. In laser power control system 250 of FIG. 4, like elements as those in laser power control system 150 of FIG. 3 will be referred to by like reference numerals. According to this embodiment of the invention, position or velocity signals in both the x and y directions are utilized in combination to control the power of laser 110. As such, this second embodiment of the invention is particularly useful in connection with systems which direct laser beam 105 in vector fashion such as in defining the outline of a cross-section of the article to be formed, or which raster scan laser beam 105 in both the x and y directions.

Similarly as laser power control system 150, laser power control system 250 generates an output laser power signal on line LP that corresponds to the product of the velocity of laser beam 105 as it scans across target surface 104, with the desired laser power to be applied during the scan when at its maximum speed. In this case, however, laser power control system 250 is capable of deriving the laser scan velocity regardless of the direction in which laser beam 105 travels, as it utilizes the scan velocity from each of the x and y directions. According to this embodiment of the invention, the scan velocity used by laser power control system 250 is generated from its x and y direction components, following the fundamental relationship:

$$V = \sqrt{(V_x)^2 + (V_y)^2}$$

for determining the velocity V from its x and y direction components $V_x$, $V_y$, respectively, in a two-dimensional system.

The time-varying x-direction feedback control signal on line XFB is received by low pass filter 20x in laser power control system 250, and the filtered signal is applied to gate 22x, as in laser power control system 150 described above. Gate 22x is controlled by the signal on line LON/LOFF_ from scanner processor 103 to selectively pass and block the filtered signal when laser 110 is to be on and off, respectively. The output of gate 22x is forwarded to one input of selector 25x, and to differentiator 24x which presents its output to a second input of selector 25x. Selector 25x is controlled by the state of line V/P_ to select the output of gate 22x for application to line XVEL responsive to the state of line V/P_ indicating that the feedback control signal on line XFB corresponds to a time-varying velocity signal, and to select the output of differentiator 24x for application to line XVEL responsive to the state of line V/P_ indicating that the feedback control signal on line XFB corresponds to a time-varying position signal. As noted above, line V/P_ will typically be implemented by a jumper that is hardwired to the appropriate voltage. Accordingly, laser power control system 250 generates a time-varying signal on line XVEL corresponding to the velocity of laser beam 105 in the x-direction during such time as laser 110 is to be on, similarly as described above relative to laser power control system 150.

In similar fashion, laser power control system 250 receives a time-varying y-direction feedback control signal on line YFB and, based upon this signal, generates a time-varying signal on line YVEL corresponding to the velocity of the scan of laser beam 105 in the y-direction. Accordingly, similarly as in the case of the x-direction feedback control signal on line XFB, time-varying y-direction feedback control signal on line XFB is received by low pass filter 20y and the filtered signal is applied to gate 22y. Gate 22y is also controlled by the signal on line LON/LOFF_ from scanner processor 103 to selectively pass and block the filtered signal according to when laser 110 is to be on and off, respectively. The output of gate 22y is connected to one input of selector 25y, and to differentiator 24y, with the output of differentiator 24y being also applied to selector 25y. Under the control of the state of line V/P_ selector 25y selects the output of gate 22y for application to line YVEL responsive to the feedback control signal on line YFB corresponding to a time-varying velocity signal, and selects the output of differentiator 24y for application to line YVEL responsive to the feedback control signal on line YFB corresponding to a time-varying position signal. In either case, line YVEL carries a time-varying signal corresponding to the y-direction velocity of the scan of laser beam 105.

Line XVEL is applied to two inputs of multiplier 27x, which in turn generates a signal on line XVELSQ corresponding to the square of the x-direction velocity signal on line XVEL. Similarly, multiplier 27y generates a signal on line YVELSQ corresponding to the square of the y-direction velocity signal on line YVEL that is applied to its inputs. The squared velocity signals on lines XVELSQ and YVELSQ are summed together by summer 29, and applied to the input of square root circuit 30 online SUMSQ. Square root circuit 30 generates a signal on line RTSUMSQ at its output, corresponding to the square root of the sum of the squares of the x-direction and y-direction velocities, and applies this signal to multiplier 28. Multiplier 28 receives the full power level signal on line DLP from computer 140 at its other input, and generates a time-varying output signal on line LP corresponding to the product of the desired full laser power signal on line DLP and the scan velocity on line RTSUMSQ during such times as laser 110 is turned on. As before, multiplier 28 may apply scaling and normalization factors to this multiplication, as appropriate for the particular application.

Figure 5:
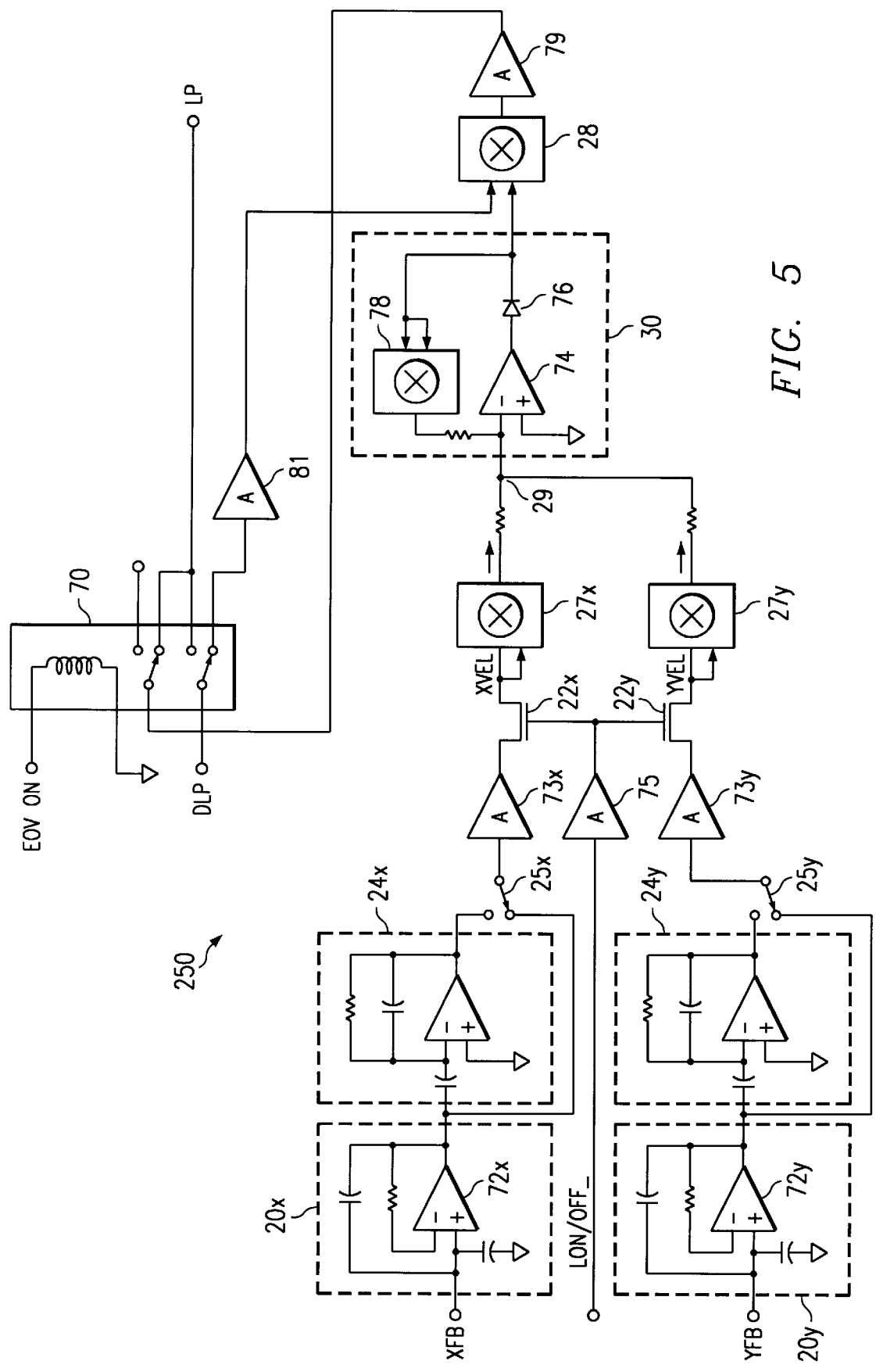
FIG. 5 is an electrical diagram, in block form, of an exemplary implementation of the laser power control system of FIG. 4.

Referring now to FIG. 5, the detailed construction of an exemplary implementation of laser power control system 250 according to the second embodiment of the invention will now be described in detail. According to this exemplary implementation of FIG. 5, laser power control system 250 is an analog system, and as such the feedback control signals on lines XFB, YFB and the desired laser power signal on line DLP are analog signals, as is the output laser power signal on line LP. The control signal on line LON/LOFF_ is a digital signal to indicate the times at which laser 110 is to be on and off. Elements of FIG. 5 that correspond to functions in the functional block diagram of FIG. 4 will be indicated by the same reference numerals.

According to this implementation, low-pass filters 20x, 20y are implemented as active low-pass filters by way of operational amplifiers 72x, 72y, respectively, with passive components connected thereto in the conventional manner to provide the desired filter characteristics. In this example, operational amplifiers 72x, 72y receive the velocity signals XFB, YFB, respectively, at their inverting inputs, and include two capacitors connected in the conventional manner to provide a two-pole low-pass filtered output signal at their respective outputs.

In this embodiment of the invention, the outputs of low-pass filters 20x, 20y are applied to differentiators 24x, 24y, respectively, and to one pole of selectors 25x, 25y. As apparent from a comparison of FIGS. 4 and 5, the implementation of laser power control system 250 illustrated in FIG. 5 inserts differentiators 24x, 24y and selectors 25x, 25y prior to gates 22x, 22y; it is contemplated that the order of these elements is not critical in the implementation. As illustrated in FIG. 5, differentiators 24x, 24y are implemented by way of operational amplifiers 71x, 71y, each with the appropriate capacitive input coupling and capacitive feedback so as to implement a time differentiation function as is conventional in the art. Selectors 25x, 25y are simply implemented as switches, such as DIP switches or simply as alternative wiring points, for selecting either the output of low-pass filters 20x, 20y or the output of differentiators 24x, 24y to be forwarded to gates 22x, 22y, depending upon the type of feedback control signal received at lines XFB, YFB. As noted above, if position signals are received at lines XFB, YFB, then switches 25x, 25y will select the output of differentiators 24x, 24y; conversely, if velocity signals are received at lines XFB, YFB, then switches 25x, 25y will select the output of low-pass filters 20x, 20y, bypassing differentiators 24x, 24y (as shown in the example of FIG. 5).

Selectors, or switches, 25x, 25y apply the selected signal to corresponding amplifiers 73x, 73y, respectively. Amplifiers 73x, 73y are also preferably implemented by operational amplifiers with conventional bias and feedback connections appropriate to provide the desired amplification characteristics. The output of amplifiers 73x, 73y are applied to pass gates 22x, 22y, each of which are controlled by the signal received on line LON/OFF_ (buffered and amplified by amplifier 75) to pass the output of the corresponding amplifiers 73x, 73y to lines XVEL, YVEL, respectively, during such time as laser 110 is to be turned on. During such time as laser 110 is to be turned off, as indicated by the signal on line LON/OFF_, pass gates 22x, 22y are maintained open; a small discharge transistor may be provided at lines XVEL, YVEL, if desired, to pull the voltage at these lines to ground while pass gates 22x, 22y are off, if desired. While pass gates 22x, 22y are illustrated as pass transistors as shown in FIG. 5, it is of course contemplated that other types of switching components may alternatively be used therefor.

Lines XVEL, YVEL are each applied to two inputs of a respective analog multiplier 27x, 27y. Analog multipliers 27x, 27y are conventional analog multiplier circuits for generating output current signals corresponding to the product of the input analog signals. In this case, since the two inputs of analog multipliers 27x, 27y receive the same signal (lines XVEL, YVEL, respectively), analog multipliers 27x, 27y operate to square the input signals. In this implementation, because the output signals generated by analog multipliers 27x, 27y are currents, the outputs of analog multipliers 27x, 27y are connected together at node 29, such that the current at node 29 corresponds to the sum of the squared velocities on lines XVEL, YVEL. Summer 29 of FIG. 4 thus simply corresponds to the simple connection of the outputs of multipliers 27x, 27y at node 29 as shown in FIG. 5.

The summed current at node 29 is applied (after amplification, if desired) to the inverting input of operational amplifier 74 in square root circuit 30. In the implementation of FIG. 5, square root circuit 30 is an analog circuit for generating an output analog signal that corresponds to the square root of it s input signal. As conventional in the art for analog circuits, square root circuit 30 is configured as an operational amplifier with resistive feedback, with diode 76 at its output and analog multiplier 78 in the feedback loop, where multiplier 78 receives the signal at the cathode of diode 76 at both of its inputs. The output of square root circuit 30 is applied to one in put of analog multiplier 28.

The desired laser power signal on line DLP from computer 140 is received by relay 70, in the implementation of FIG. 5. Relay 70 permits the selective enabling and disabling of laser power control system 250 in response to a signal on line EOV ON from computer 140. If laser power control system 250 is to be disabled, relay 70 is open, such that line DLP is connected directly to line LP; in this event, the laser power signal on line LP is constantly at its maximum desired level indicated on line DLP by computer 140, a nd the velocity-based control provided by laser power control system 250 is not dapplied. Relay 70 enables laser power control system 250 in response to a signal on line EOV ON, causing line DLP to be connected to the input of buffer amplifier 81 (and connecting line LP to the output of amplifier 79, as shown in FIG. 5 and described below); the state of relay 70 with laser power control system 250 enabled is illustrated in FIG. 5.

Buffer amplifier 81 is a conventional operational amplifier with feedback components arranged to provide the appropriate normalization and amplification of the desired laser power signal on line DLP. The output of amplifier 81 is applied to a second input of analog multiplier 28. Analog multiplier 28 thus produces an analog, time-varying, output signal corresponding to the product of the desired laser power communicated on line DLP with the square root of the sum of the squares of the x and y direction scan velocities (when laser 110 is on), as communicated thereto from square root circuit 30. T he output of analog multiplier 28, after amplification by amplifier 79 to apply any desired scaling or normalization factor, is communicated through relay 70 to line LP as the laser power level to which laser 110 is to be driven. This signal is, of course, a time-varying signal that varies over time with the scan velocity signal generated by laser power control system 250, and thus controls laser 110 to drive laser 110 with the appropriate power level.

Figure 6:
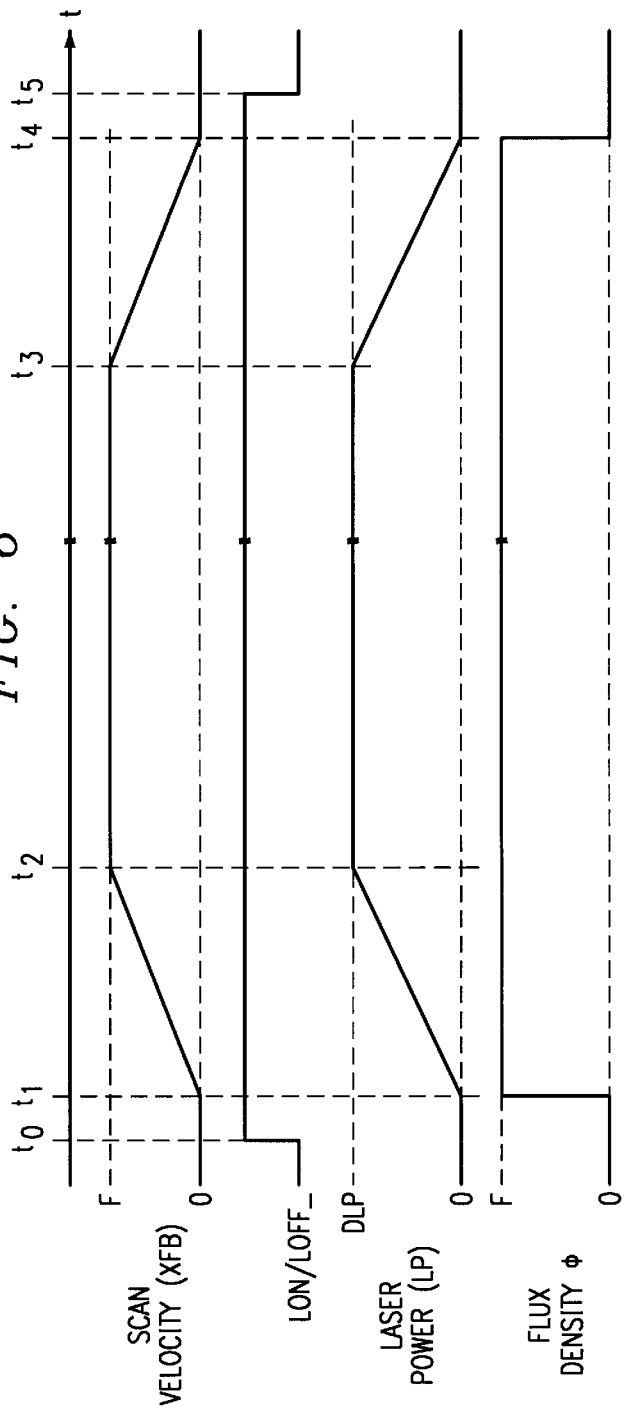
FIG. 6 is a timing diagram illustrating the operation of the first embodiment of the invention in applying laser power to a scan.

Referring now to FIG. 6, an example of the operation of laser control system 250 according to the second embodiment of the present invention will now be described. In the example of FIG. 6, a scan of laser beam 105 in the x-direction will be illustrated; it is, of course, understood that the operation of laser power control systems 150, 250 according to the first and second embodiments of the invention, respectively, will be identical in this case (as the y-direction velocity will be zero). Of course, laser power control system 250 will operate in a similar fashion for scans in any direction, as it derives a scan velocity signal from the x and y direction velocity (or position) components as described hereinabove. In particular, for this example of a raster scan along a single direction (e.g., the x-direction), the feedback control signal for the second direction (e.g., the y-direction) will simply be at zero, and the operation of laser power control system 250 will be accurate for this scan.

The example of FIG. 6 illustrates the operation of the preferred embodiment over time. In this example, the x-direction scan of laser beam 105 begins from a first boundary of the cross-section of the article being formed, and scans to a second boundary of the cross-section. In this example, laser 110 is turned on when the aim of laser beam 105 is at the first boundary, and turned off when the aim is at the second boundary; in other words, laser 110 is turned on and off at such time as its aim is stationary. This type of operation is preferred, according to this embodiment of the invention, so that variations in galvanometer delay do not affect the location at which fusing of the powder begins; it has been observed, in connection with the present invention that this preferred mode of operation is particularly beneficial in the fabrication of thin-walled articles. As such, referring back to FIG. 5 in combination with FIG. 6, gates 22x, 22y are turned off prior to time to as indicated by the low logic level on line LON/LOFF_, and then turned on by a transition of the signal on line LON/LOFF_ at time $t_0$ as shown.

In this example, referring to FIG. 5, lines XFB, YFB are communilcating velocity signals from scanner processor 103, and as such switches 25x, 25y are both set to bypass differentiators 24x, 24y. Because the scan has not yet started at time $t_0$, however, x-direction laser scan velocity signal XFB (which is a velocity signal rather than a position signal in this case) is at zero prior to and at time $t_0$; as this is an x-direction raster scan, the velocity signal on line YFB is and will remain at zero (and is not shown in FIG. 6).

In this example, the scan of laser beam 105 begins at time $t_1$. At this time, scanner processor 103 controls galvanometer 149 to begin to turn mirror 147 and thus direct the aim of laser beam 105 from the first boundary of the article cross-section toward the second boundary. As galvanometer 149 accelerates, the velocity increases from zero, at time $t_1$, toward full velocity (F), which is reached at time $t_2$ as shown by signal XFB in FIG. 6.

Powder at target surface 104 begins to be fused as mirror 147 directs laser be am 105 across target surface, beginning at time $t_1$. Between time to and time $t_2$, the x-direction scan velocity is less than its full velocity level F, as indicated by the ramping signal on line XFB. According to the preferred embodiment of the present invention, however, once the signal on line LON/OFF_ is at a high level after time $t_0$, gates 22x, 22y pass the filtered velocity signals on lines XFB, YFB to multipliers 27x, 27y; again, as this is an x-direction raster scan, the velocity signal on line YFB is at zero. The x-direction velocity signal is squared by multiplier 27x, and applied to the input of square root circuit 30; square root circuit 30 then drives multiplier 28 with a signal corresponding to the square root of the squared x-direction velocity, which is of course the x-direction raster scan velocity itself. Multiplier 28 then generates a signal on line LP that is the product of the desired laser power on line DLP with the x-direction scan velocity of galvanometer 149. As illustrated in FIG. 6, the laser power signal on line LP is at an intermediate power level between time $t_1$ and time $t_2$, corresponding to the intermediate scan velocity of galvanometer 149 at this point in time.

As the scan of laser beam 105 continues from time $t_1$, galvanometer 149 continues to accelerate until it reaches its full scan speed at time $t_2$; accordingly, the laser power signal on line LP, at the output of multiplier 28, similarly continues to increase along with the increasing scan velocity. At time $t_2$, galvanometer 149 reaches its full velocity (F), and accordingly the laser power signal on line LP reaches the level of the desired laser power signal on line DLP, as this is the programmed laser power indicated by computer 140. During the full speed portion of the scan beginning at time $t_2$, full laser power is applied by laser 110 to the powder at target surface 104 as the laser beam 105 is scanned at full speed thereacross.

As the end of the scan is being reached, galvanometer 149 begins deceleration at time $t_3$ so that it may be fully stopped upon reaching the scan endpoint. Because the deceleration portion of the end of the scan includes portions of the article to be formed in the powder, as the scan velocity of galvanometer 149 begins to drop at time $t_3$ while laser 110 remains on (line LON/OFF__high), the laser power signal generated on line LP by multiplier 28 begins to drop from its full level (DLP) at time $t_3$ until the scan velocity reaches zero, at time $t_4$. During the deceleration interval between time $t_3$ and time $t_4$, the laser power signal on line LP is at an intermediate power level, corresponding to the intermediate scan velocity of galvanometer 149. The scan velocity reaches zero as the aim of laser beam 105 reaches the end of the cross-section of the article, at which time the laser power signal on line LP also reaches zero, at time $t_4$. Following the end of the scan, for example at time $t_5$, laser 110 may then be turned off (indicated by line LON/OFF__making a high-to-low transition).

The present invention thus provides the important advantage of delivering a uniform laser energy flux density to the powder at target surface 104 in the system of FIGS. 1 and 2. This is illustrated in the example of FIG. 6 by the plot of flux density $\Phi$ which is zero prior to and after the scan, which is at such times as the scan velocity is zero. At locations within the cross-section of the article being formed, however, the laser energy flux density $\Phi$ is constant. This is because the laser power output (line LP) is made directly proportional to the scan velocity so that the resulting energy flux $\Phi$, which is proportional to the laser power and inversely proportional to the scan velocity, remains constant. The laser energy flux density $\Phi$ remains constant even at those locations at the ends of the scan where the galvanometers are accelerating and decelerating, as shown by way of example in FIG. 6 in the acceleration interval between time $t_1$ and time $t_2$, and in the deceleration interval between time $t_3$ and time $t_4$.

According to the preferred embodiments of the invention, therefore, uniform laser energy is applied to all locations of the powder in a selective laser sintering at which the article is being formed. This uniformity of energy delivery eliminates such geometry-dependent distortion effects as end-of-vector bloom, which can occur in conventional systems in which the laser scan is decelerating at the end of a scan, but with constant laser power being applied. Finer resolution articles, with reduced dimensional distortion, can thus be produced by selective laser sintering through implementation of the present invention.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A selective laser sintering apparatus, comprising:
   a powder delivery system, for applying successive layers of powder at a target surface;
   a laser for generating a laser beam;
   a scanning system, for scanning the laser beam across the target surface along a vector; and
   a laser power control system, having an output coupled to the laser, having an input coupled to the scanning system to receive a control signal indicative of the operation of the scanning system in directing the laser at the target surface, having an input for receiving a desired laser power signal indicative of a desired laser power level, and having an input for receiving a laser on/off signal indicating when the laser is to be turned on and off, the laser power control system for producing, at its output, a laser power signal corresponding to the product of the desired laser power level with a scan velocity based on the control signal;
   wherein the laser power control system comprises:
      a gate, coupled to receive the control signal, and having a control terminal coupled to receive the laser on/off signal, for selectively passing and blocking the control signal responsive to the laser on/off signal; and
      a multiplier, coupled to receive the control signal from the gate and to receive the desired laser power signal, for generating the laser power signal corresponding to the product of the gated control signal and the desired laser power signal.

2. The apparatus of claim 1, wherein the control signal comprises a feedback signal corresponding to the scan velocity at which the scanning system is directing the laser at the target surface.

3. The apparatus of claim 1, further comprising:
   a computer, coupled to the scanning system, for storing a data base representation of an article to be fabricated.

4. The apparatus of claim 1, wherein the laser power control system has first and second inputs coupled to the scanning system for receiving first and second control signals indicative of the operation of the scanning system in directing the laser at the target surface in first and second orthogonal directions, respectively.

5. A selective laser sintering apparatus, comprising:
   a powder delivery system, for applying successive layers of powder at a target surface;
   a laser for generating a laser beam;
   a scanning system, for scanning the laser beam across the target surface along a vector; and
   a laser power control system, having an output coupled to the laser, having an input coupled to the scanning system to receive a feedback signal indicating a position of the target surface at which the scanning system aims the laser, and having an input for receiving a desired laser power signal indicative of a desired laser power level, the laser power control system for producing, at its output, a laser power signal corresponding to the product of the desired laser power level with a scan velocity based on the feedback signal, wherein the laser power control system comprises:

a differentiator, coupled to receive the feedback signal, for generating a velocity signal based upon the feedback signal; and a multiplier, coupled to receive the velocity signal from the differentiator and the desired laser power signal, for generating a laser power signal corresponding to the product of the velocity signal and the desired laser power signal.

6. The apparatus of claim 5, wherein the laser power control system further comprises:

a gate, having an input coupled to receive the feedback signal, having an output coupled to the input of the differentiator, and having a control terminal coupled to receive a laser on/off signal, for selectively passing and blocking the control signal responsive to the laser on/off signal.

7. The apparatus of claim 6, further comprising:

a computer, coupled to the scanning system, for storing a data base representation of an article to be fabricated.

8. A method of controlling the laser power in a selective laser sintering apparatus, the selective laser sintering apparatus including a scanning system that directs the aim of a laser at a target surface at which powder is dispensed and at which an article is to be formed, the method comprising the steps of:

receiving a feedback signal from the scanning system, the feedback signal indicating a position of the target surface at which the scanning system aims the laser;

determining a scan velocity by differentiating the control signal over time to generate a velocity signal;

multiplying the velocity signal by a desired laser power to generate a laser power signal;

applying the laser power signal to the laser to control its power output.

9. A selective laser sintering apparatus, comprising:

a powder delivery system, for applying successive layers of powder at a target surface;

a laser for generating a laser beam;

a scanning system, for scanning the laser beam across the target surface along a vector; and a laser power control system, having an output coupled to the laser, having first and second inputs coupled to the scanning system for receiving first and second control signals indicative of the operation of the scanning system in directing the laser at the target surface in first and second orthogonal directions, respectively, having an input for receiving a desired laser power signal indicative of a desired laser power level, and having an input for receiving a laser on/off signal indicating when the laser is to be turned on and off, the laser power control system for producing, at its output, a laser power signal corresponding to the product of the desired laser power level with a scan velocity based on the control signal;

wherein the laser power control system comprises:

a first gate, coupled to receive the first control signal, and having a control terminal coupled to receive the laser on/off signal, for selectively passing and blocking the first control signal responsive to the laser on/off signal; and a first multiplier, coupled to receive the gated first control signal from the gate, for generating a signal corresponding to the square of the first gated control signal;

a second gate, coupled to receive the second control signal, and having a control terminal coupled to receive the laser on/off signal, for selectively passing and blocking the second control signal responsive to the laser on/off signal; and a second multiplier, coupled to receive the gated second control signal from the gate, for generating a signal corresponding to the square of the second gated control signal;

a square root circuit, coupled to receive the signals generated by the first and second multipliers, for generating a signal corresponding to the square root of the sum of the squares of the first and second gated control signals; and a multiplier, coupled to receive the signal from the square root circuit and to receive the desired laser power signal, for generating a laser power signal corresponding to the product of the signal from the square root circuit and the desired laser power signal.

10. The apparatus of claim 9, further comprising:

a computer, coupled to the scanning system, for storing a data base representation of an article to be fabricated.

11. The apparatus of claim 9, wherein the first and second control signals comprise feedback signals corresponding to the scan velocity at which the scanning system is directing the laser at the target surface in the first and second orthogonal directions, respectively.

12. The apparatus of claim 9, wherein the first and second control signals comprise feedback signals indicating a position of the target surface at which the scanning system aims the laser in the first and second orthogonal directions, respectively;

and wherein the laser power control system further comprises:

a first differentiator, having an input coupled to the first gate to receive the gated first control signal and having an output coupled to an input of the first multiplier, for generating a first velocity signal based upon the first control signal; and a second differentiator, having an input coupled to the second gate to receive the gated second control signal and having an output coupled to an input of the second multiplier, for generating a second velocity signal based upon the second control signal.

13. A method of controlling the laser power in a selective laser sintering apparatus, the selective laser sintering apparatus including a computer that stores a computer-readable data base representation of the article to be fabricated, the method comprising the steps of:

receiving a control signal from a scanning system in the selective laser sintering apparatus, the control signal indicative of the operation of the scanning system in directing the aim of a laser at a target surface at which powder is dispensed and at which an article is to be formed;

generating a laser on/off signal based upon the data base representation;

selectively passing and blocking the control signal responsive to the laser on/off signal;

determining a scan velocity from the selectively passed and blocked control signal;

generating a laser power signal corresponding to the product of the scan velocity and a desired laser power level, the laser power signal corresponding to the product of the scan velocity and a desired laser power level only at times when the laser on/off signal is at an on state; and applying the laser power signal to a laser in the selective laser sintering apparatus to control its power output.

14. The method of claim 13, wherein the control signal comprises a feedback signal corresponding to a velocity at which the scanning system scans the directed aim of the laser across the target surface.

15. A method of controlling the laser power in a selective laser sintering apparatus, the selective laser sintering apparatus including a scanning system that directs the aim of a laser at a target surface at which powder is dispensed and at which an article is to be formed, and including a computer that stores a computer-readable data base representation of the article to be fabricated, the method comprising the steps of:

receiving, from the scanning system, first and second control signals indicative of the operation of the scanning system in directing the laser at the target surface in first and second orthogonal directions, respectively;

generating a laser on/off signal based upon the data base representation;

selectively gating the first and second control signals responsive to the laser on/off signal;

generating a first squared signal corresponding to the square of the first gated control signal;

generating a second squared signal corresponding to the square of the second gated control signal;

generating a square root signal corresponding to the square root of the sum of the first and second squared signals;

multiplying the square root signal and a desired laser power to generate a laser power signal; and applying the laser power signal to the laser to control its power output.

16. The method of claim 15, wherein the first and second control signals comprise feedback signals corresponding to the scan velocity at which the scanning system is directing the laser at the target surface in the first and second orthogonal directions, respectively.

17. The method of claim 15, wherein the first and second control signals comprise feedback signals indicating a position of the target surface at which the scanning system aims the laser in the first and second orthogonal directions, respectively;

and wherein the method further comprises:
differentiating the first control signal over time to generate a first velocity signal, so that the first squared signal corresponds to the square of the first gated velocity signal; and differentiating the second control signal over time to generate a second velocity signal, so that the second squared signal corresponds to the square of the second velocity signal.

\* \* \* \* \*